United States Patent [19]

Orcutt

[11] 4,043,612
[45] Aug. 23, 1977

[54] BEARING STRUCTURE

[75] Inventor: Frederic K. Orcutt, San Jose, Calif.

[73] Assignee: Ampex Corporation, Redwood City, Calif.

[21] Appl. No.: 584,270

[22] Filed: June 6, 1975

[51] Int. Cl.² ............................ F16C 7/04; F16C 35/00
[52] U.S. Cl. ............................................. 308/9; 308/10; 308/72
[58] Field of Search .................. 308/9, 98, 10, 36.3, 308/72, 1; 277/80

[56] References Cited

U.S. PATENT DOCUMENTS

| 3,746,407 | 7/1973 | Stiles et al. | 308/9 |
| 3,834,775 | 9/1974 | Tuffias et al. | 308/9 |
| 3,883,193 | 5/1975 | Hepp et al. | 308/9 |

Primary Examiner—Joseph F. Peters
Assistant Examiner—Richard A. Bertsch
Attorney, Agent, or Firm—Charles M. Carman, Jr.

[57] ABSTRACT

A spiral-groove self-pressurizing bearing structure is provided with a magnetic lubricant and magnetic means to retain the lubricant in the bearing at rest. During operation, the spiral grooves pressurize and distribute the lubricant within the bearing structure, and the magnetic retention means prevents entrainment of air into the bearing, and consequent loss of lubricating action.

10 Claims, 9 Drawing Figures

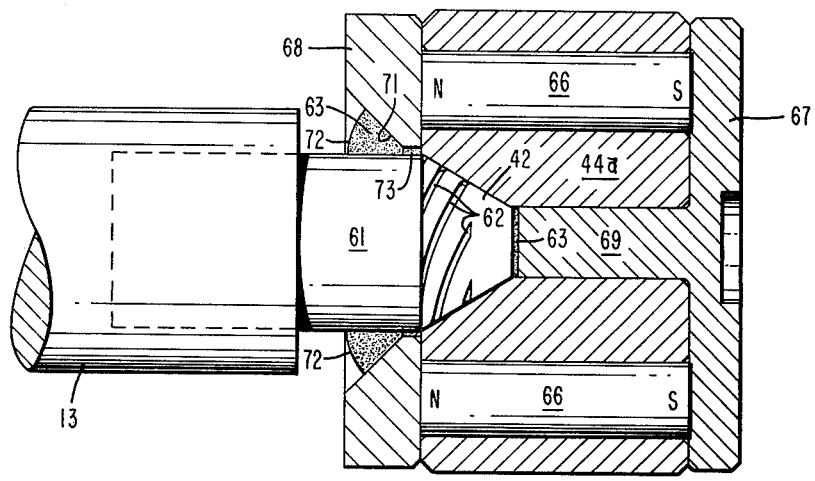
FIG_2
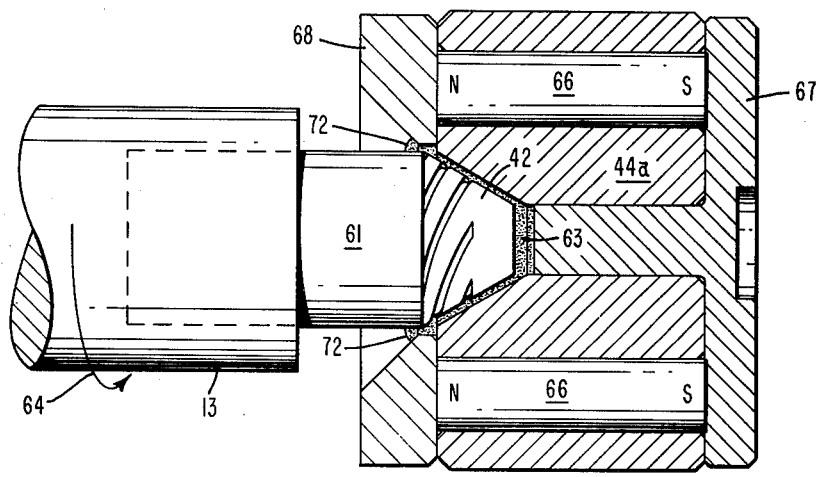
FIG_3
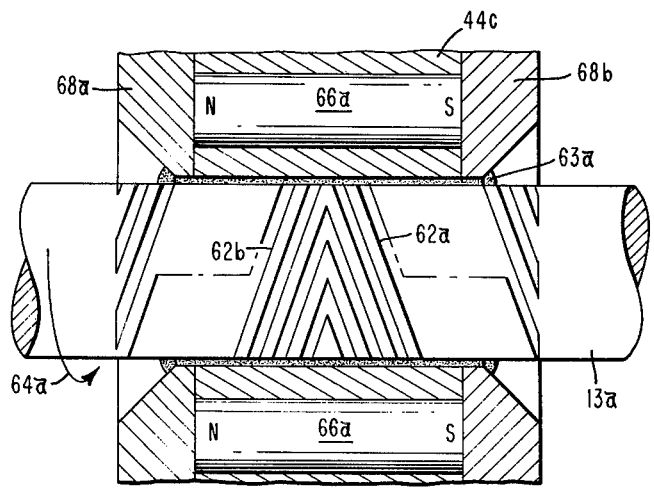
FIG_4

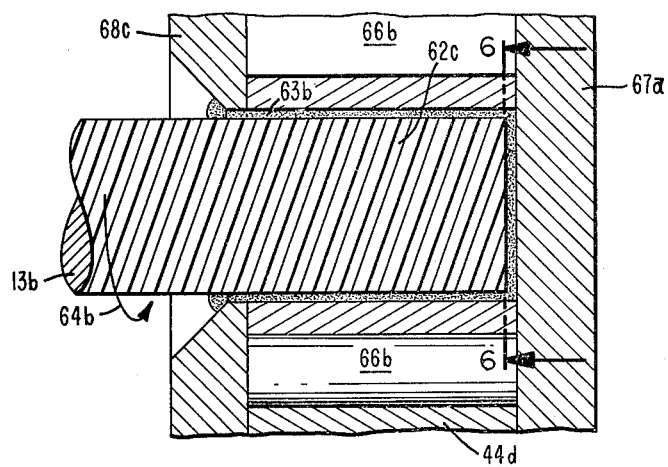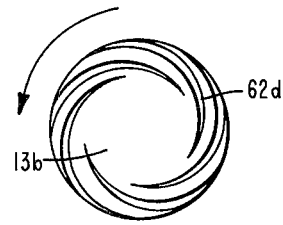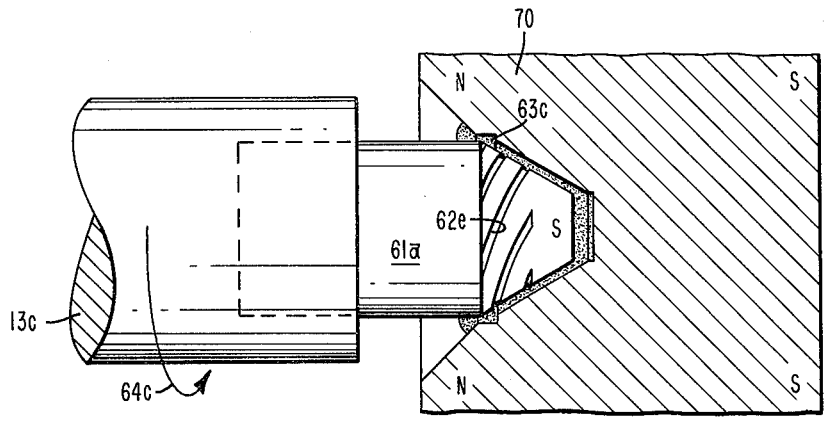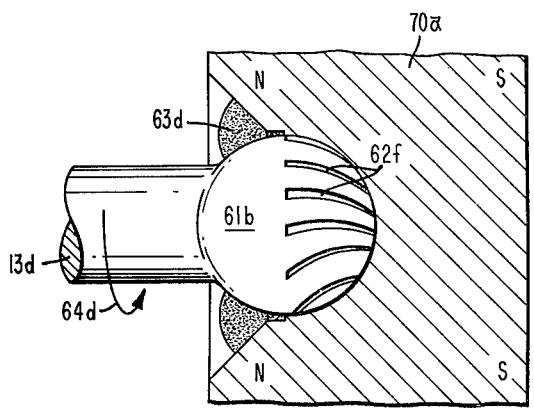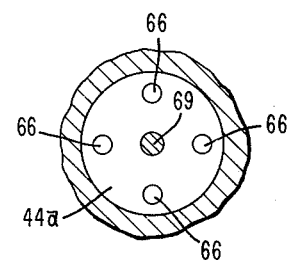

BEARING STRUCTURE

BACKGROUND OF THE INVENTION

This invention relates to bearings between relatively moving elements, and particularly to slider bearings and to thrust and journal bearings between a shaft and bearing block.

Properly arranged grooves in slider, thrust and journal bearings are useful for increasing the load carrying capacity of the bearing structure, as by pumping the lubricant into the bearing against the influence of the load, which usually tends to squeeze the lubricant out. When the bearing is at rest, however, many lubricants tend to leak out of the bearing, urged by the bearing load, unopposed by pumping action. To counter this tendency, it has been proposed to use certain greases which are solids, in effect, and which remain as solids at the bearing entrance when it is stopped. Alternatively, it has been proposed to provide the entrance zone of the bearing with non-wetting surfaces to which lighter lubricants such as oil adhere with the result that the lubricant is retained in the bearing even at rest.

Another problem with grooved or pumping bearings, which problem is not solved by the use of grease or non-wetting surfaces, is that of entrainment of air into the bearing during operation, due to the combined effects of centrifugal force and the pumping action of the grooves. Such entrainment decreases the load-carrying capacity of the grease or oil in the bearing.

Now it has been discovered that the use of properly arranged magnetic lubricants in grooved bearings, together with magnetic retention means therefor, not only has the effect of preventing leakage of the lubricant when the bearing is stopped, but also has the more surprising effect of preventing entrainment of air into the bearing during operation.

Accordingly, it is an object of the invention to provide a bearing structure in which the load-carrying capacity of the lubricant is increased during operation without having leakage of the lubricant when the bearing is not operating; and It is another object of the invention to provide a bearing structure as above described, and also having the effect of preventing entrainment of air into the bearing and lubricant during operation.

SUMMARY OF THE INVENTION

These and other objects are attained in the present invention, wherein a spiral-groove self-pressurizing bearing structure is provided with a magnetic lubricant and magnetic means to retain the lubricant in the bearing at rest. During operation, the spiral grooves pressurize and distribute the lubricant within the bearing structure, and the magnetic retention means prevents entrainment of air into the bearing, and consequent loss of lubricating action.

DESCRIPTION OF THE DRAWINGS

FIG. 2 is an enlarged cross-sectional view of a portion of the apparatus shown in FIG. 1;

FIG. 3 is a view taken similar to FIG. 2 and showing the structure thereof in operation;

FIG. 4 is a cross-sectional view of an alternative embodiment of the invention;

FIG. 5 is a cross-sectional view of another embodiment of the invention;

FIG. 6 is a cross-sectional view taken on the plane of lines 6—6 of FIG. 5;

FIG. 7 is a cross-sectional view of still another embodiment of the invention;

FIG. 8 is a cross-sectional view of still another embodiment of the invention; and FIG. 9 is a cross-sectional view taken along the plane of arrows 9—9 of FIG. 1.

DESCRIPTION OF THE UTILIZING APPARATUS

Figure 1:
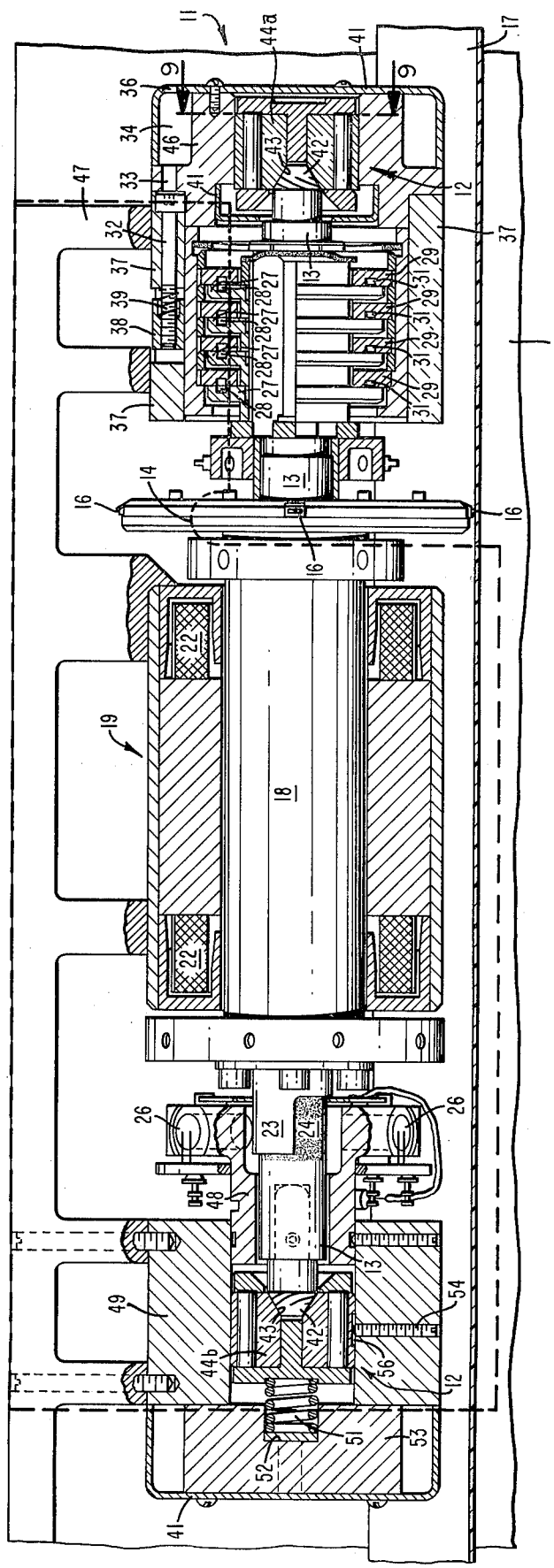
FIG. 1 is a broken-away plan view of an apparatus incorporating the bearing structure of the invention.

Referring now to FIG. 1, there is shown an apparatus 11 adapted to use the bearing 12 of the invention at both ends of a rotating shaft 13, upon which is secured a rotating drum 14 mounting four magnetic transducing heads 16 for recording and reproducing television or other broadband signals upon and from a longitudinally-moving magnetic tape 17.

Also mounted on the shaft 13 is a rotor 18 for a driving motor 19, of which the stator armature 21 and coil 22 are also shown. There is also shown a pair of differently-reflecting sectors 23 and 24 meant to be illuminated by light-emitting diodes 26 at three angularly equi-spaced points about the shaft, and to be viewed by photocells (not shown) at points intermediate to the diodes, all forming part of a tachometer device for the shaft 13. And lastly, there is provided an array of signal coupling transformers, used for transmitting the video signal to and from the heads 16 and from and to the stationary record-reproduce electronic circuit. The transformers comprise four rotating transformer halves 27, each with a coil 28, and four stator transformer halves 29, each with a coil 31. The spacing between the halves is adjustable by means of set screws 32, accessible through openings 33, 34 and 36, rotating freely though fixed in axial position in a stator block 37, and threaded into axially slidable clock 38 within which are mounted the stator transformer halves 28; and a compression spring 39 takes up the slack. A protective mu-metal cover 40, outlined in phantom, is also provided, and similar covers 41 are provided elsewhere as needed to shield magnetic and other fields.

As shown in FIG. 1, the two ends of shaft 13 are tapered to define truncated-conical bearing surfaces 42, which match and fit into conforming conical recesses 43 in the bearing blocks 44a and 44b, forming what will be understood to be combination thrust and journal type bearings. One of the blocks, 44a, is fixedly mounted in a member 46, which is in turn solidly attached to the stator block 37; and block 37 is solidly affixed to a heavy base casting 47, which also mounts the motor stator armature 21 and supports blocks 48 and 49 for the fixed portion of the tachometer and for the other bearing block 44b.

To enable the bearing system to center the shaft 13 snugly while it is not rotating, but more loosely for the admission of lubricant during operation, the bearing block 44b is mounted to be axially slidable in its support block 49, and is spring loaded toward the bearing block 44a, as by means of coil compression spring 51, mounted in a recess 52 in an end block 53 that is secured to support block 49. A set screw 54, fitting into an axially elongated recess 56 in the bearing block 44b, holds the block 44b in rotational position and permits only the required range of axial play.

DESCRIPTION OF THE PREFERRED EMBODIMENTS

To counter the tendency of lubricant to leak out of the bearings, a combination pumping and magnetic structure is used. As shown more particularly in FIG. 2, the end of shaft 13 (e.g., stainless steel) has press-fitted therein an extension 61 made of magnetically permeable material, such as hardened steel, and constituting the actual member upon which the conical bearing surface 42 is formed. The conical portion 42 is also provided with an array of spiral or helical-spiral grooves 62 directed so as to cause pumping of the lubricant 63 into the bearing when the shaft is rotated in the appropriate direction, as shown by the arrow 64 in FIG. 3. To retain the lubricant when the shaft is stopped (FIG. 2), a magnetic lubricant is selected and the block 44a is provided with four similarly oriented permanent magnets 66 (see also FIG. 9) aligned parallel to the bearing axis and equispaced circumferentially about the axis. In some uses, it has been found advisable to omit the magnet 66 that lies closest to the tape, and no deleterious result has been observed. The magnets 66 are retained in conforming pockets in the block 44a, which is non-magnetic, and between a pair of magnetically permeable pole pieces 67 and 68. Pole piece 68 has a central extension 69 fitting into a central recess of block 44a so as to carry one pole of the magnetic circuit as close as possible to the tip of the permeable member 61, while pole piece 68 has the shape of a collar fitting around the member 61 to bring the opposite pole of the magnetic circuit as close as possible to member 61. Thus when the magnetic lubricant is present, it is retained in the gaps between the pole piece 67 and member 61, and between pole piece 68 and member 61, and tends to concentrate in these two places especially when the shaft is stopped (FIG. 2), when the conical surface of member 61 is in substantially surface contact with the concave conical surface of the block 44a. To aid in storing the lubricant in stopped condition, the pole piece 68 is internally bevelled or chamfered to define an expanding cup 71 into which the lubricant can retreat in the form of a meniscus 72. During rotation (FIG. 3) however, the meniscus 72 grows smaller as the lubricant is pumped into the growing space between the member 61 and block 44a, until an equilibrium condition is reached between the internal pressure of the lubricant and the forces exerted by the load and by spring 51. The chamfering of cup 71 also ensures that a stronger magnetic field is concentrated at the narrowest portion 73 of the gap between member 61 and pole piece 68, and therefore tends to concentrate the lubricant there as well, aiding the meniscus 72 to shrink and feed its stored lubricant into the bearing whenever any axial separation is induced between member 61 and member 44a.

Of course, shrinking of the meniscus upon even nonrotating separation (as for example by manual or other external forces) between the shaft and bearing block would take place, even without chamfering of pole piece 68, merely because creation of an expanding space would suck the lubricant inwardly, and the internal cohesion of the magnetic lubricant would ensure that air bubbles would not be entrained, only lubricant. This internal cohesion of the magnetic lubricant is also useful in preventing entrainment of air when the bearing is operating, when the tendency to entrain air is aided by centrifugal force. Experience with non-magnetic grease bearings in uses of the type illustrated has indicated that air entrainment is a severe problem.

Such entrainment has several bad effects, such as: (1) the axial position of the shaft is not certainly repeatable from one operation to another, depending upon the amount of air by which the grease lubricant has been diluted, and this is a grave disadvantage in the present apparatus, in which the ability of the rotating transformers 27-31 to transmit signals depends upon the axial gap between the stator transformer halves 29 and the rotating halves 27 mounted on the shaft 13. Also (2) the radial stiffness of the bearing is degraded by entrained air, permitting imprecise and varying positioning of the rotating heads 16 with respect to the tape 17. It will be understood that the penetration of the head into the tape in passage is critical, since the tape is stretched locally around the head in what is called a "tent", the amount of stretch being a function of the depth of penetration and the actual wave length of the signal being a function of the amount of stretch. Air entrainment can therefore cause undesirable variations in the recorded or reproduced signal. Lastly bearing the life of the bearing and its elements is shortened by air entrainment, which permits undesirable play and vibration in the bearing.

A magnetic lubricant of the type used successfully in the present being structure is also termed a "ferrofluid", and is defined as "a colloidal suspension of magnetic particles in a carrier liquid" (see "Designing with Ferrofluids" by Ronald Moskowitz, Mechanical Engineering, February, 1975). The particles (e.g., magnetite) are ultramicroscopic and are coated to prevent flocculation even when a magnetic field is applied. Lubricants that have been used as ferrofluids include synthetic hydrocarbons, diesters, fluoroethers, petroleum oils, and water. A specific lubricant that has been used in the present invention is Ferrofluidics Corporation diester based DO1 having a ciscosity of 75 centipoise.

Bearing construction 44b is precisely similar to that of 44a, except for the addition of spring 52. In addition, bearing 44a has a magnetically permeable shield cover 75, to protect the magnetic tape 17 from stray fields of the magnets 66.

FIGS. 4-8 illustrate variational forms of the invention.

In FIG. 4 is shown a plain journal bearing comprising a shaft 13a having two sets of oppositely directed helical grooves 62a and 62b arranged to pump toward the axial midpoint of a bearing block 44c having a journal bore entirely therethrough, magnets 66a and similar end pole pieces 68a and 68b, and magnetic lubricant 63a.

In FIG. 5, there is shown a combined thrust and journal bearing in which both shaft 13b and the opening in journal-type bearing block 44d have right-circular-cylindrical shapes, and the pole piece 67a for magnets 66b serves as a thrust bearing face. A chamfered pole piece 68c and ferrofluidic lubricant 63b are also provided, and the shaft 13b is formed with circumferential helical pumping grooves 62c and spiral end grooves 62d (FIG. 6) cooperating to pump into the bearing when the shaft is rotated in the direction of arrow 64b.

FIG. 7 shows a bearing of the type shown in FIGS. 2 and 3 except that separate magnets and pole pieces are avoided by making the entire bearing block 70 out of a permanent magnet, in which case member 61a can be made of magnetically permeable material, or alternatively of permanent magnet material presenting a pole of opposite polarity to the adjacent pole of the block 70.

This bearing also has magnetic lubricant 63c and grooves 62e arranged to pump into the bearing when shaft 13c is rotated in the direction of arrow 64c.

FIG. 8 shows a magnetically permeable spherical end member 61b for shaft 13d, bearing grooves 62f arranged to pump into bearing block 70a when shaft 13d is rotated in the direction of arrow 64d. Block 70a, like block 70 in FIG. 7, is made of a permanent magnet, as shown.

What has been described is a spiral-groove self-pressurizing bearing structure provided with a magnetic lubricant and magnetic means to retain the lubricant in the bearing at rest. During operation, the spiral grooves pressurize and distribute the lubricant within the bearing structure, and the magnetic retention means prevents entrainment of air into the bearing and consequent loss of lubricating action.

I claim:

1. A bearing structure for a pair of relatively moving elements, characterized in that:
   a magnetic lubricant is disposed between said elements; and
   magnetic means are provided for retaining said lubricant between said pair of elements;
   said magnetic means including means for establishing opposite magnetic polarities in at least two portions of said structure, said portions having confronting faces defining a primary magnetic air gap flux path therebetween for focussing said magnetic fluid between said elements;
   said faces being inclined divergingly with respect to one another, adjacent said primary magnetic air gap flux path, to define a secondary magnetic air gap flux path serving as a reservoir, for receiving excess magnetic lubricant from said primary air gap when the volume defined between said elements decreases or the volume of said lubricant increases, and for supplying magnetic lubricant to said primary air gap when the volume defined between said elements increases or the volume of said lubricant decreases; and
   at least one of said elements is formed with pumping grooves for receiving magnetic lubricant from at least said secondary reservoir air gap and for pressurizing and distributing said lubricant between said elements during relative movement of the elements.

2. A bearing structure as described in claim 1, and further characterized in that:
   one of said elements has a recess presenting a surface of revolution within which a conforming portion of the other element fits for relative rotation.

3. A bearing structure as described in claim 2, and further characterized in that:
   said elements are magnetized to provide opposite attracting poles, concentrically arranged one in each element, at the opening of said recess.

4. A bearing structure as described in claim 2, and further characterized in that:
   said recess and the conforming portion of said other element are right-circular-cylindrical in form defining a shaft and a journal bearing block therefor;
   said pumping grooves are helical on the sides of one of said elements within said recess; and
   said grooves are directed to pump toward the midaxial portion of said recess in said block when said shaft is rotating in a predetermined direction.

5. A bearing structure as described in claim 2, and further characterized in that:
   said recess and the conforming portion of said other element are right-circular-cylindrical in form defining a shaft and a combination thrust and journal bearing block therefor; and
   said pumping grooves are spiral on the circular end of one of said elements within said recess, and helical on the sides of said one element within said recess, and all of said grooves are directed to pump toward the central end portion of said shaft and recess when said shaft is rotating in a predetermined direction.

6. A bearing structure as described in claim 2, and further characterized in that:
   said recess and the conforming portion of said other element have confronting surfaces that are at least in part inclined with respect to both the axis of said relative rotation and a plane normal to said axis, so as to define a combination thrust and journal bearing; and
   means are provided for urging said elements together in the direction of said axis to provide centering action in both rotating and non-rotating modes.

7. A bearing structure as described in claim 2, and further characterized in that:
   said recess and the conforming portion of said other element are conical in shape, defining a shaft and a combination thrust and journal bearing block therefor; and
   said pumping grooves are helical on the conical portion of one of said elements, so as to pump toward the central end portion of said shaft and recess when said shaft is rotating in a predetermined direction.

8. A bearing structure as described in claim 7, and further characterized in that:
   said recess and the conforming portion of said shaft are frustro-conical, the conical converging surface of said recess being defined by a non-magnetic body portion of said block;
   the base portion of said conical converging surface of said recess being defined by a first pole-piece supported by said block body portion and encircling said shaft so as to form an opening into said recess;
   the frustrum end of said frusto-conical recess being defined by a second pole-piece supported by said block body portion and extending radially from the axis of rotation of said shaft; and
   said magnetic means including at least two bar permanent magnets similarly oriented and aligned parallel to said axis spaced circumferentially thereabout, said magnets being supported by said block body portion and engaging said pole pieces at either end; said shaft being of magnetically permeable material, so as to define a return circuit path for the field of said magnets.

9. A bearing structure as described in claim 8, and further characterized in that:
   said first pole piece is chamfered to define a bevel surface encircling said shaft and converging radially inwardly toward the shaft end, so that said ferromagnetic lubricant protruding from said opening tends to concentrate at the smallest interior diameter of said first pole piece.

10. A bearing structure as described in claim 9, and further characterized in that:
    said shaft is frustro-conical at both ends, and two of said blocks are provided supporting said shaft at each end;

one of said bearing blocks being fixed and the other being slidable in the axial direction of said shaft; and means are provided for urging said slidable bearing block toward said fixed bearing block;

whereby said blocks are urged together when said shaft is stopped, to effect substantial supporting and centering engagement of the conical surfaces of said shaft and blocks, with the excess of said ferrofluidic lubricant being squeezed out to form a meniscus between said shaft and the chamfered surfaces of said first pole pieces, but yet upon rotation of said shaft in said predetermined direction, said fluid is pumped under substantial pressure into said recesses to force said blocks somewhat apart and to support the load of said shaft while lubricating the rotation thereof, and all without entraining air into the bearings.

* * * * *